US012806935B2

(12) United States Patent
Arpaci et al.

(10) Patent No.: US 12,806,935 B2
(45) Date of Patent: Nov. 24, 2026

(54) HUB CAP SYSTEM, WHEEL HEAD AND USE OF A SEALING RING

(71) Applicant: SAF-HOLLAND GmbH, Bessenbach (DE)

(72) Inventors: Muhammet Arpaci, Hösbach (DE); Elmar Weber, Dülmen (DE); André Katzke, Weibersbrunn (DE)

(73) Assignee: SAF-HOLLAND GmbH, Bessenbach (DE)

( * ) Notice: Subject to any disclaimer, the term of this patent is extended or adjusted under 35 U.S.C. 154(b) by 348 days.

(21) Appl. No.: 18/508,569

(22) Filed: Nov. 14, 2023

(65) Prior Publication Data

US 2024/0157724 A1 May 16, 2024

(30) Foreign Application Priority Data

Nov. 14, 2022 (DE) ..................... 10 2022 130 086.2

(51) Int. Cl.
*B60B 7/00* (2006.01)
*B60B 7/06* (2006.01)

(52) U.S. Cl.
CPC ............ *B60B 7/0013* (2013.01); *B60B 7/066* (2013.01)

(58) Field of Classification Search
CPC ... B60B 7/0013; B60B 7/002; B60C 23/0039; B60C 23/00327; B60C 23/00345
See application file for complete search history.

(56) References Cited

U.S. PATENT DOCUMENTS

| | | | | |
|---|---|---|---|---|
| 5,752,746 | A * | 5/1998 | Perry | B60B 7/00 301/108.4 |
| 11,712,922 | B2 * | 8/2023 | Henry | B60B 27/0073 301/108.1 |
| 12,109,847 | B2 * | 10/2024 | Wasserfuhr | B60C 23/00363 |
| 2005/0194079 | A1 * | 9/2005 | Hennig | B60C 23/00363 152/417 |
| 2009/0241655 | A1 * | 10/2009 | Ingram | B60C 23/00318 73/146.3 |

FOREIGN PATENT DOCUMENTS

| | | | | |
|---|---|---|---|---|
| CN | 102870286 | A * | 1/2013 | H02G 3/0658 |
| DE | 102019111422 | A1 | 11/2020 | |
| DE | 102021122133 | A1 | 3/2023 | |
| WO | WO-2021030485 | A1 * | 2/2021 | B60C 23/00363 |
| WO | 2023025850 | A1 | 3/2023 | |

* cited by examiner

*Primary Examiner* — Jason R Bellinger
*Assistant Examiner* — Taekwon Choi
(74) *Attorney, Agent, or Firm* — Price Heneveld LLP

(57) ABSTRACT

A hub cap system includes a hub cap and a sealing ring, wherein the hub cap system is configured to rotate about an axial direction, wherein a radial direction is perpendicular to the axial direction, wherein the hub cap at least partially encloses an inner space, wherein the hub cap includes and/or forms a fluid channel which is in fluid communication with the inner space or opens into the inner space, the sealing ring being held in a circumferential groove of the hub cap system, the groove being in fluid connection with the fluid channel or being capable of being brought into fluid connection with the fluid channel via openings.

18 Claims, 4 Drawing Sheets

HUB CAP SYSTEM, WHEEL HEAD AND USE OF A SEALING RING

BACKGROUND

The invention relates to a hub cap system, a wheel head and the use of a sealing ring.

Hub cap systems are already known from the prior art. These serve to delimit a cavity of a wheel hub in the axial direction from the surroundings. The hub cap according to the invention also fundamentally serves this purpose. However, a problem with the hub caps already known is that they often have to withstand an overpressure in the cavity of the wheel hub, especially in a tire inflation system. However, if the overpressure becomes too great, this can quickly lead to failure of the hub cap or its fastening and/or dirt and moisture can penetrate the cavity.

It is therefore the task of the invention to prevent failure of the hub cap and to effectively provide a venting option that prevents or at least makes it more difficult for dirt or moisture to enter the inner space of a wheel hub.

SUMMARY

According to the invention, a hub cap system is provided. Advantageously, the hub cap system comprises a hub cap and/or a sealing ring, wherein the hub cap system is designed to rotate about an axial direction, wherein a radial direction is or can be perpendicular to the axial direction, wherein the hub cap at least partially encloses an inner space, wherein the hub cap system, the hub cap system, in particular the hub cap, having and/or forming a fluid channel which is in fluid connection with the inner space and/or opens into the inner space, the sealing ring being held in a circumferential groove of the hub cap system, wherein the groove, in particular via openings and/or via apertures, are or can be brought into fluid communication with the fluid channel. The hub cap system according to the invention can form or provide a part or even an entire venting system for the inner space or cavity of a wheel hub and/or a hub cap. The venting system or the hub cap or the wheel hub or the hub cap system can in particular be part of a commercial vehicle and connect or vent a compressed air system of the commercial vehicle, in particular a compressed air system of a tire inflation system of the commercial vehicle and/or the vehicle, to the environment in a fluid-connecting manner, in particular in the event of a leak. The venting system, the wheel hub and/or the hub cap system can therefore in particular also be part of a tire inflation system of a vehicle, in particular a commercial vehicle. A commercial vehicle in the sense of the invention is in particular a vehicle with a permissible total mass of more than 3.5 t, preferably of more than 7.5 t and particularly preferably of more than 15 t. Alternatively or additionally preferably, the commercial vehicle may in particular be a roadworthy or road-bound commercial vehicle. Particularly preferably, the commercial vehicle is a commercial vehicle trailer, in particular a semi-trailer. The hub cap system according to the invention in particular comprises a hub cap and/or a sealing ring. The hub cap serves in particular to be attached, advantageously reversibly, to a wheel hub so as to delimit the inner space of the wheel hub from the surroundings. In particular, the hub cap may have a click fastener and/or snap-in lugs and/or other fastening means which are insertable into corresponding receiving elements of the wheel hub in order to provide a connection between the hub cap and the wheel hub. In other words, the hub cap can have fastening means, in particular male fastening means, which can engage in corresponding fastening structures, in particular female fastening structures, of the wheel hub, so as to secure the hub cap to the wheel hub, in particular reversibly. The hub cap can in particular be formed from plastic, in particular for the predominant part. The predominant part refers in particular to the weight of the hub cap. The hub cap therefore serves in particular to seal off or delimit an inner space or cavity of the wheel hub from the environment. For this purpose, the hub cap has in particular an end wall or end walls which prevent entry or exit in the axial direction. The axial direction according to the invention is in particular the direction relative to which the hub cap rotates and/or about which the wheel hub later rotates. Advantageously, the center of gravity of the hub cap lies on the axial direction. The hub cap can therefore be designed in particular to rotate about the axial direction. Standing perpendicular to or pointing away from the axial direction is the radial direction. In particular, the positive radial direction points away from the axial direction. In addition to the axial direction and the radial direction, a circumferential direction can also be formed, which is formed circumferentially around the axial direction. In other words, therefore, the axial direction, the radial direction and the circumferential direction may be perpendicular to each other and/or form a cylindrical coordinate system with each other, wherein the axial direction may form the height coordinate, the radial direction may form the radial coordinate and the circumferential direction may form the angular coordinate. In particular, the hub cap is formed such that it has an inner space. The inner space is bounded in particular in the axial direction at least on one side by the hub cap. This inner space can subsequently also be partially arranged or formed inside the wheel hub and/or connected to the inner space of the wheel hub or form a common cavity. In order to allow a fluid outlet from this inner space into the environment, the hub cap system, in particular the hub cap, has a fluid channel and/or at least partially forms a fluid channel. This fluid channel is in particular formed in such a way that it is in fluid communication with the inner space or opens into the inner space. By a merging it is to be understood in particular that one end of the fluid channel merges, in particular directly, into inner space. A fluid-acting connection or a fluid connection in the sense of the invention means in particular that a fluid can flow from one region into the other region, in particular directly, which are each in fluid connection with one another. In order to achieve a secure fixation of the sealing ring, the latter is held in a circumferential groove. In particular, the sealing ring forms a self-contained ring. A groove in the sense of the invention can be understood in particular as a material recess or depression. Advantageously, this material recess/depression has a main extension direction which is perpendicular to the depth direction of the groove. Particularly preferably, the main extension direction of the groove extends in the circumferential direction. Perpendicular to the main direction of extension of the groove are, in particular, the depth direction of the groove and the width direction of the groove. It is expedient that the groove is designed to be circumferential and thus also forms a self-contained ring. Alternatively or additionally preferred to a material recess, the groove can also be formed by a circumferential free space formed between two components. By arranging the sealing ring in the groove, it can be held securely against displacement. The groove in turn is in fluid communication with the fluid channel, in particular via apertures, or can be brought into fluid communication with the fluid channel. This fluidic guiding effect between the fluid channel and the groove therefore makes it possible to bring out or apply to the sealing rings a pressure prevailing in the fluid channel, so that the sealing ring moves within the groove as a result of this pressure, thus enabling fluid to flow laterally past the sealing ring. This provides a particularly simple and advantageous means of venting the inner space of the hub cap system and/or the hub cap. In addition, however, this can also—likewise primarily by means of the sealing rings—prevent liquid and/or impurities from entering the inner space. Advantageously, the fluid channel itself can open directly into the groove and/or one or a plurality of apertures can be provided, which in turn can fluidically connect or join the fluid channel to the groove. Advantageously, the apertures have a smaller flow cross-section compared to the fluid channel. Expediently, the apertures can extend perpendicularly to the fluid channel and/or wherein expediently a plurality of apertures, in particular arranged equidistantly, can bring or bring the fluid channel into fluid connection with the groove. In this way, a particularly uniform pressure distribution on the sealing ring can be achieved, so that local overloading and/or local stress peaks on the sealing ring are prevented or minimized.

Advantageously, the sealing ring is an O-ring. This makes it possible to achieve a particularly cost-effective design.

Advantageously, the hub cap system has a plurality of sealing rings and a plurality of circumferential grooves, one sealing ring being arranged in a or each groove. In other words, the sealing rings can each be held in a groove of the hub cap system. Hereby, a particularly effective venting possibility can be created, whereby not only the volumetric venting capacity can be increased, but much more, the failure safety of the venting system can be further increased. Advantageously, each of these grooves is in fluid communication with the fluid channel.

Advantageously, the sealing ring or at least one of the sealing rings encloses the axial direction and/or wherein the sealing ring and/or one of the sealing rings is arranged at a distance from the axial direction in the radial direction. In other words, at least one sealing ring, which is arranged in particular in a circumferential groove, can enclose the axial direction. It is particularly preferred if the center of gravity of the sealing ring and/or the central point of the groove around which it is circumferentially formed lies on the axial direction. In this way, a particularly good venting possibility can be created. Alternatively, or additionally preferably, at least one sealing ring, which is held in particular in a circumferential groove of the hub cap system, can also be arranged at a radial distance from the axial direction. A radial distance from the axial direction means in particular that the sealing ring does not surround the axial direction and/or that there is at least a radial distance between the point of the sealing ring closest to the axial direction and the axial direction itself. This can create a particularly good maintainability and/or exchangeability and/or mountability of the sealing ring.

Preferably, the fluid channel extends essentially parallel to the axial direction. This makes it possible to achieve a particularly compact design of the fluid channel in the radial direction. By the extension of the fluid channel is meant in particular its main direction of extension and/or the connecting line between the beginning and the end of the fluid channel. By a substantially parallel in the sense of the invention is meant in particular that the smallest angle present between the two enclosed directions may be a maximum of 15°, preferably a maximum of 7°, particularly preferably a maximum of 2.5° and especially strongly preferred a maximum of 1°. Quite preferably, essentially parallel can also be understood to mean that only deviations due to production may lie between the essentially parallel and the ideally parallel.

Alternatively, the fluid channel can extend essentially parallel to the radial direction. In this way, particularly short flow paths can be achieved, which can lead to particularly simple and fast as well as safe venting.

Advantageously, the groove lies in a plane perpendicular to the axial direction. Advantageously, the majority of the grooves, particularly preferably all grooves, in which a sealing ring is arranged in each case, lie in a plane that is perpendicular to the axial direction. By a groove standing perpendicular to the axial direction is to be understood in particular that at least one plane exists, the normal of which is parallel to the axial direction, which in each case intersects the groove and/or which, viewed along the circumference of the groove, is arranged or can be arranged between the two side wall regions of the groove. By designing the groove or grooves in such a way that they lie in a plane perpendicular to the axial direction, a particularly simple assembly can be achieved, because, especially in the case of elastic sealing rings, such an arrangement reduces in particular the mechanically stored energy in the sealing ring, so that the longevity of the sealing ring can be increased as a result.

Preferably, the sealing ring is predominantly, and especially preferably completely, made of rubber. This makes it possible to achieve a particularly high sealing effect.

It is expedient that the groove is formed symmetrically with respect to a plane, the plane having in particular a normal parallel to the axial direction. Advantageously, not only one of the grooves in which the sealing ring can be arranged, but the major part and especially preferably all grooves are formed symmetrically to a plane, which has a normal parallel to the axial direction. By symmetrical it is to be understood that the flanks of the groove or its walls are formed mirror-symmetrically to a plane, whereby this applies in particular to a sectional plane which is spanned by the axial and radial directions. In other words, the groove can therefore have identical side flanks or walls on the left and right in a sectional plane spanned by the axial and radial directions.

Alternatively, or additionally preferred, the groove or some of the grooves or all grooves can also be designed asymmetrically to a plane, whereby the plane can have a normal parallel to the axial direction. The asymmetrical design can be used to specifically influence which of the two flanks or walls of the groove are to be used to serve primarily for venting. In other words, the asymmetrical design can be used to specifically influence which side of the sealing ring is to be used for venting.

In a preferred embodiment, the sealing ring rests against the flanks of the groove. The flanks of the groove are in particular the wall sections of the groove or its walls. In this way, a particularly good sealing effect can be achieved within the groove.

It is expedient that the sealing ring is arranged completely in the groove, the groove preferably being closed in the radial direction at least in sections by a ring element arranged in the groove. By completely arranged in the groove it is to be understood in particular that the sealing ring does not project beyond the groove in the radial direction. Preferably, therefore, the groove projects beyond the sealing ring in the radial direction when the sealing ring is arranged completely in the groove. Advantageously, the groove, viewed in the radial direction, can be closed at least in sections by a ring element arranged in the groove. Thus, a ring element can cover the groove in the radial direction.

In other words, the ring element, viewed in the circumferential direction, can therefore prevent engagement in the groove at least in sections. In this way, however, protection of the sealing ring in particular can be achieved, while at the same time preventing loss of the sealing ring in addition to the resilience of the sealing ring itself. Expediently, however, a clearance and/or a free space is provided in the radial direction between the sealing ring and the ring element, so as to permit a possibility of movement in the radial direction of the sealing ring. In this specific context, a ring element can either be understood as a completely ring-shaped element or the ring element can also form only a ring section, in which case, however, this must be formed over at least 180° ring angle. Preferably, the element has at least 240° annular angle and/or at least 320° annular angle. In other words, therefore, in a preferred variant, there may exist a region of preferably a maximum of 40° which is not formed or mapped by the ring element, in particular in the direction of rotation. Alternatively, or additionally preferably, the ring element may also comprise apertures, bores or other fluid-connecting female-formed elements so as to achieve fluid flow through the ring element. Advantageously, the ring element is arranged in the groove in such a way that the ring element is positively secured against displacement in the axial direction.

In a preferred embodiment, the sealing ring is preloaded in the positive radial direction, in particular by means of an insert or inserts. In other words, the sealing ring can be designed in such a way that it has an elastic recovery capability in the positive radial direction. Traditionally, sealing rings are usually designed in such a way that they have a preload capacity in the negative radial direction. A preload capacity provided in the opposite direction, namely in the positive radial direction, can be achieved, for example, by inserts, in particular spring wire inserts.

It is expedient that the groove is formed on a projection of the hub cap, in particular on a projection projecting in the axial direction, which can be cylindrical in shape. This allows particularly easy access to the groove and thus to the sealing ring. The cylindrical design makes it possible to achieve a particularly low-notch and material-saving design of the projection. Expediently, the projection is thereby formed in a material-locking and/or integral manner with the hub cap and/or a component of the hub cap. In other words, the projection can therefore be formed and or produced in particular by a primary forming process with further components and/or with the entire hub cap. In this way, a particularly mechanically loadable design can be achieved.

Preferably, the groove and/or the sealing ring located/arranged in the groove is covered by a cover element in the axial direction and/or in the radial direction, wherein a flow exit channel, in particular annular, can be formed between the cover element and the hub cap. By covering in the radial direction, it is to be understood in particular that the projection of the cover element in the axial direction surrounds the projection onto the groove and/or the sealing ring in each case and/or includes the projection of the groove and/or the sealing ring. By covering in the radial direction, on the other hand, it is to be understood in particular that the projection of the covering element onto the axial direction surrounds and/or includes the projection of the groove and/or the sealing ring. The design in such a way that the cover element covers the groove and/or the sealing ring can prevent mechanical damage, in particular, for example, by a high-pressure cleaner and/or by objects whirled up during travel. Advantageously, a flow outlet channel is formed between the cover element and the hub cap. This allows an effective venting option to be formed. Advantageously, this flow outlet channel is annular. It therefore forms a self-contained ring in particular. This allows a particularly effective air outlet or fluid outlet option to be created.

In a preferred embodiment, the cover element is fixed to the hub cap by a force-fit and/or reversible attachment. In particular, this can be achieved by an interference fit. For example, the cover element may therefore have fingers or other male fastening means which are oversized relative to the corresponding female fastening means of the hub cap, so that an interference fit is formed between these two components. Alternatively, or additionally preferably, the cover element can also be fixed to the hub cap by means of screws. This is a particularly cost-effective and quickly releasable reversible connection.

Advantageously, the hub cap system has a rotor unit, the rotor unit having and/or forming or comprises a compressed air duct, the rotor unit being fixed to the hub cap, the rotor unit being guided by the hub cap. In particular, the rotor unit serves to achieve a compressed air passage through the hub cap or wheel cap. In other words, the rotor unit in particular has a compressed air duct. Fundamentally, in the sense of the invention, hub cap and hub cap can be synonyms. The rotor unit is in particular fixed to the hub cap in such a way that a relative rotation in/about the axial direction and/or a translational movement, in particular in the axial direction and/or the radial direction, between the hub cap and the rotor unit is/are prevented. In particular, the rotor unit has a compressed air duct which can expediently extend in the axial direction. Advantageously, the major part of the compressed air duct extends in the axial direction. The compressed air duct serves in particular to guide compressed air. In other words, therefore, the compressed air duct is designed in particular such that it can withstand a pressure of at least 3 bar, preferably at least 7 bar, and particularly preferably at least 10 bar. The compressed air duct can in particular be formed by metallic components and/or plastic components. The compressed air duct leads in particular through the hub cap and/or the rotor unit is led through the hub cap. In this way, compressed air can be conducted from the inner space of the hub cap to the outer area in a particularly effective manner. In particular, the rotor unit is designed to rotate about the axial direction relative to the ground during operation. In other words, the rotor unit rotates in a later system with the rotational speed of the wheel hub or wheel of the wheel head, which may include the rotor unit and/or the hub cap system.

In a preferred embodiment, the rotor unit has a port, wherein the port has a thread, wherein the port is or can be brought into fluid communication with the compressed air channel. In other words, the rotor unit can have a connection to which further fluid-connecting elements, in particular a hose, can be fixed. In particular, the port is in fluid communication with the compressed air channel, so that a fluid can flow from the compressed air channel into the port, and advantageously further into a tire. For mounting further elements on the connection, the connection in particular has a thread. The connection can point in particular in the radial direction and/or the thread can be formed around the radial direction. This can create a particularly space-saving and compact option for mounting a hose later in operation.

In an alternatively or additionally preferred embodiment, the rotor unit and/or the compressed air duct is guided through or by a central opening of the hub cap, wherein preferably the central opening surrounds the axial direction and/or is preferably formed, in particular rotationally symmetrically, about the axial direction. In other words, the rotor unit and/or the compressed air duct of the rotor unit can be guided through a central opening of the hub cap in order to pass from the inner space of the hub cap into an outer surrounding region of the hub cap. The central opening is designed in particular in such a way that it surrounds the axial direction and/or is rotationally symmetrical, advantageously about the axial direction. This makes it possible to achieve a particularly low-balance design.

In an advantageous embodiment, the groove is formed by the hub cap and the rotor unit. In other words, at least some of the walls and/or the components of the groove, in particular the side walls, are each formed at least partially by the hub cap and/or the rotor unit. Conveniently, therefore, for example, one of the side walls of the groove bordering in the axial direction may be formed by the rotor unit and the other side wall of the groove bordering in the axial direction may be formed by the hub cap. In this way, a particularly cost-effective design of the groove can be achieved, which also allows the sealing ring to be replaced inside the groove in a simple manner.

Advantageously, the port points in the radial direction. In other words, the port of the rotor unit is designed to point in the radial direction. This makes it possible to achieve a particularly compact design in the axial direction, so that valuable installation space can be saved.

In an advantageous embodiment, the hub cap is formed in several parts, wherein a central element or main body of the hub cap can in particular form the central opening. In particular, the hub cap can be formed by several components with each other. Suitably, these multiple components of the hub cap are irreversibly fixed to each other. In other words, the hub cap may comprise a plurality of elements that can only be destructively detached from each other. For example, the hub cap may comprise a central element and a main body. In particular, the main body forms the areas of the hub cap that are in contact in the radial direction. The central element, on the other hand, can in particular be that element of the hub cap which in particular forms the central opening. Alternatively, preferably, a trademark can also be formed on the central element in a simple manner. The advantage of this multi-part design and the attachment of a brand label to the central element lies in particular in the ease of manufacture. This applies in particular also against the background that branded elements often require additional material mixtures, in particular for color characterization, which can therefore be easily manufactured in particular when arranged in a separate central element. Particularly preferably, the central element has red, in particular a red circle, elements which are visible in particular in the axial direction. This leads in particular to a particularly simple assembly and/or identification of the central element and/or the central opening. In particular, these red elements and/or the red circle are designed in such a way that they surround the central opening. In this way, a particularly effective and clear characterization of the central opening can be achieved, which in turn leads to simplicity of assembly and the prevention of incorrect assembly.

Advantageously, the hub cap, in particular a main body of the hub cap, has fastening means, in particular snap-on fasteners. This makes results in a particularly simple assembly. Advantageously, these fastening means project in the axial direction and/or in the radial direction. Advantageously, these fastening means can be reversible fastening means, in particular snap lugs or projections. In this way, particularly simple assembly of the hub cap can be achieved.

In particular the groove, preferably a major part of the grooves, and particularly preferably all grooves, have a rounded side wall and/or a rounded groove base. The grooves relevant here are those in which a sealing ring is arranged in each case. The groove with a rounded side wall or with rounded side walls has a particularly low-notch design. If, on the other hand, there is a rounded groove base, this can also reduce the notch effect. Alternatively, or additionally preferred, the side wall or side walls can also be V-shaped and/or flat instead of having a rounded design. Should the side walls of the groove be V-shaped, in particular with respect to each other, a particularly defined contact surface of the and/or the sealing ring within the groove or grooves can thereby be achieved. In addition, a particularly simple manufacturing process can also be achieved in this way.

Another aspect of the invention may relate to a wheel head. A Wheel head can also be called a wheel end. Advantageously, the wheel head comprises a hub cap system as described previously and/or hereinafter. Alternatively, or additionally preferably, the wheel head may also comprise an axle element, in particular an axle stub and/or an axle tube or a wheel hub, wherein the axle element in particular comprises an internally hollow portion. In other words, the invention may also relate to a wheel head comprising an axle element and/or a wheel hub, wherein the axle element comprises a hollow or a hollow region. In particular, the hollow extends longitudinally, wherein the inner hollow region is or may advantageously be in fluid communication with the compressed air passage of the rotor unit and/or with the inner space of the hub cap. Particularly preferably, however, the hollow of the axle element is only in fluid communication—in a usual operation—with the compressed air duct. In particular, the fluid connection with the inner space of the hub cap is only present in the event of a leakage. In this way, compressed air can be fed in a particularly simple manner from the internally hollow region of the axle element into the rotor unit and thus ultimately be fed later, for example, to a compressed air system of a tire and/or a tire inflation system. In other words, the wheel head can therefore have a tire inflation system which is or can be formed at least in part by the hub cap system and/or the axle element.

Advantageously, the rotor unit projects into the hollow, in particular into the inner hollow, of the axle element and/or wherein the compressed air channel of the rotor unit is or can be brought into fluid connection with the hollow of the axle element. In other words, the rotor unit can therefore extend, in particular in axial direction, such that its end projects or is guided into the inner hollow of the axle element. Alternatively or additionally preferably, the compressed air channel of the rotor unit can also be in fluid connection with or bringable into fluid connection with the inner hollow of the axle element, so that a fluid present inside the inner hollow of the axle element, in particular compressed air, can flow into the compressed air channel.

In a preferred embodiment of the wheel end, the hub cap is fixed, in particular reversibly, to the wheel hub, and/or wherein the wheel hub is mounted on the axle element, in particular via rolling bearings. The hub cap can therefore be fixed to the wheel hub, in particular via fixing means of the hub cap itself. Alternatively or additionally preferably, the wheel hub can also be mounted on and/or by the axle element. In particular, the wheel hub is mounted on the axle element in such a way that a translational movement of the wheel hub in axial direction and/or radial direction is restricted and/or prevented by the bearing arrangement, but at the same time or alternatively a rotation about the axial direction is/is permitted by the bearing arrangement. In particular, this bearing arrangement may comprise a plurality of wheel bearings, in particular in the form of rolling bearings, wherein the wheel bearing arrangement may in particular be an O- and/or an X-arrangement. In order to prevent maintainability and/or entry of compressed air into the rolling bearings, these may in particular be permanently lubricated rolling bearings.

In a further or alternatively preferred embodiment of the wheel end, a sealing ring can be provided between the wheel hub and the hub cap, in particular with a sealing lip projecting in the positive radial direction. The sealing lip projecting in the positive radial direction can be a circumferential sealing lip, which is annular, in particular circumferential about the axial direction. The sealing lip can be formed in particular with and/or on a main body or a mounting part of the sealing ring. The sealing ring is in particular formed in such a way that this has a larger inner diameter than at least one, preferably the majority and particularly preferably all, of the sealing rings. In particular, the weight of the sealing ring, the predominant part of the sealing rings and particularly preferably all of the sealing rings, is also less than the weight of the sealing ring. In particular, the sealing ring is designed in such a way that its mounting section rests against the hub cap and the sealing lip projecting outward in the radial direction or in the positive radial direction is in contact with the wheel hub. In this way, a particularly advantageous sealing effect can be achieved. In particular, however, the hub cap or the wheel head can be designed in such a way that at least one side of the sealing lip is in fluid communication with the inner space of the hub cap. This also allows the sealing lip to be used as a further venting option.

Advantageously, the wheel head has a tire, in particular a twin tire, wherein the tire is or can be brought into fluid connection with the internally hollow region of the axle element and/or with the compressed air duct and/or with the connection. In this way, a particularly simple and inexpensive as well as effective and fluidically favorable connection of a pressure chamber of a tire to a compressed air system of a vehicle, in particular a commercial vehicle in the sense of the invention, can be achieved.

Another aspect of the invention may also relate to a use of a sealing ring in a hub cap system as preceding or following and/or in a wheel head as preceding and/or following.

An additional or alternative aspect of the invention may relate to the use of a sealing ring, in particular as previously or subsequently described, for venting an inner space of a hub cap or a wheel hub, in particular using a hub cap system as previously or subsequently described.

A further additional aspect of the invention may additionally or alternatively relate to a use of a sealing ring for venting an inner space of a hub cap system or hub cap, in particular as previously or subsequently described, and/or an inner space of a wheel end as previously or subsequently described. The inner space of the wheel head is in particular the inner space of the wheel hub or the hub cap of the wheel head.

Further advantages and features of the present invention will be apparent from the following description with reference to the figures. Individual features of the embodiments shown can thereby also be used in other embodiments, unless this has been expressly excluded.

BRIEF DESCRIPTION OF THE DRAWINGS

It is shown.

DETAILED DESCRIPTION OF THE PREFERRED EMBODIMENTS

Figure 1:
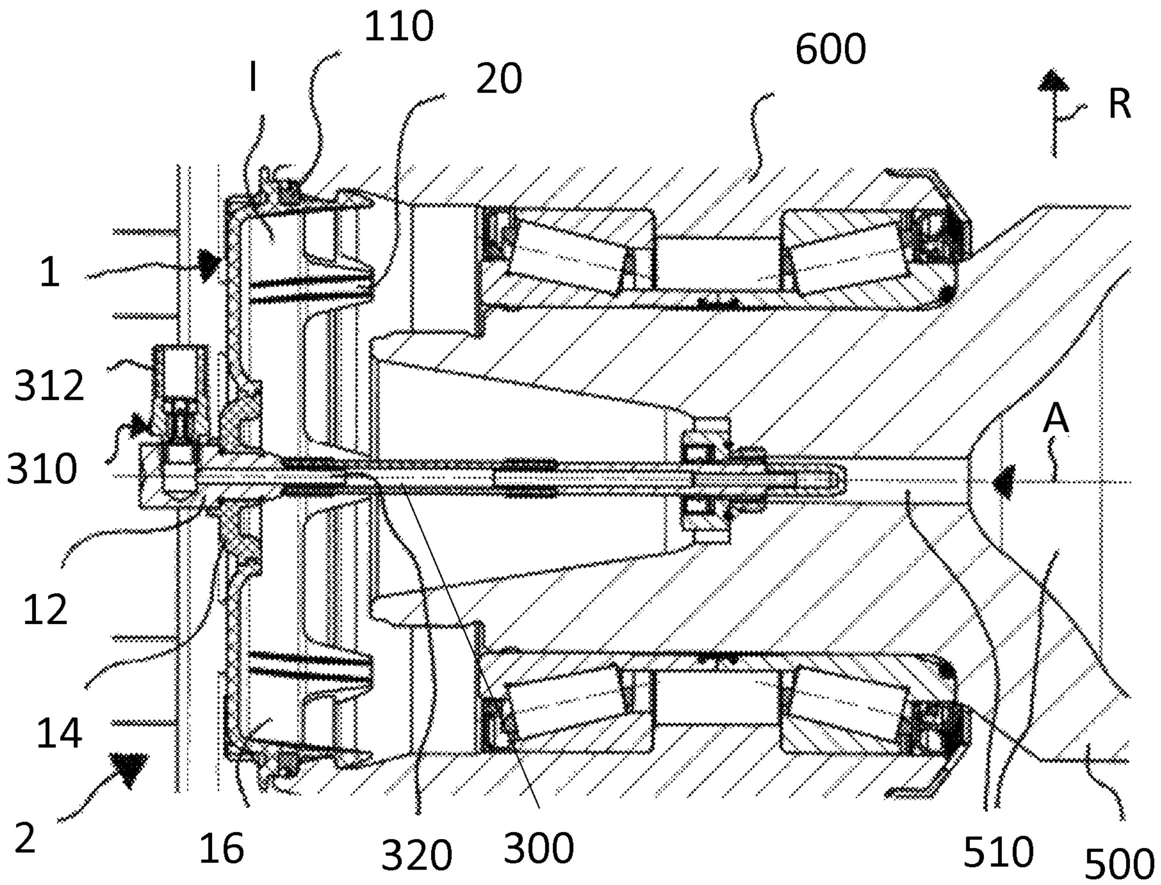
FIG. 1 is a section through a wheel head according to the invention or a section of a wheel head.

FIG. 1 shows a hub cap system 1 that is part of a wheel head 2. In addition to the hub cap system 1, the wheel head 2 also has an axle element 500, which extends in particular in the axial direction A. The axle element 500 has an inside hollow area 510. The axle element 500 has an inside hollow area 510. This inside hollow area 510 of the axle element 500 is in fluid communication with the compressed air duct 320 of the rotor unit 300. The compressed air duct 320 also extends in axial direction A and is guided through a central opening 12 of the central element 14. The central element 14 is formed by a red material so as to form a red circular element. The central element 14 is irreversibly connected to the main body 16 of the hub cap 10. The hub cap 10 is reversibly attached to the wheel hub 600 via fasteners 20. The wheel hub 600 is rotatably mounted relative to the axle element 500 about the axial direction A via sealed wheel bearings. However, in a preferred embodiment, the wheel hub 600 is configured such that relative movement between the wheel hub 600 and the axle element 500 is prevented by the bearing arrangement in the axial direction A. Perpendicularly pointing away from the axial direction A, the radial direction R is formed. In order to achieve venting of the interior or inner space I of the hub cap 10 or also of the cavity, inner space or interior of the wheel hub 600, a sealing ring 110 is provided in the embodiments shown, the sealing lip of which rests against the wheel hub 600 and the mounting region of which is guided in a groove of the hub cap 10. In the embodiments shown—not apparent due to the rotational position-a fluid channel 60 is also provided in the hub cap 10, which is delimited from the surroundings by a sealing ring 100. The fluid channel 60 can open directly into the inner space I of the hub cap 10, as is also shown, for example, in the embodiment according to FIG. 2. In particular, the embodiment shown in FIG. 1 can be combined with the specific examples of FIGS. 2, 3, 4, 5, 6, 7 and/or 8, should this be necessary.

Figure 2:
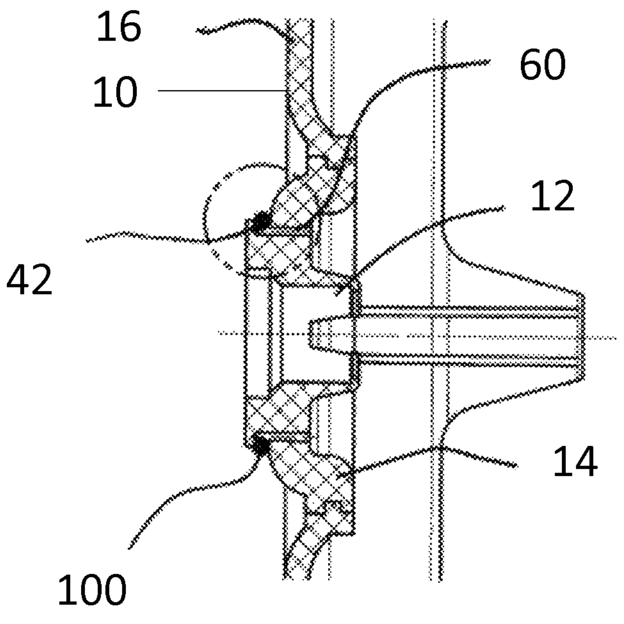
FIG. 2 is a detailed section in a cross-section through a hub cap system.

In FIG. 2, a hub cap system 1 is shown in detail in a sectional view, the sectional plane being spanned by the axial direction A and the radial direction R. The hub cap 10 again has a main body 16 and a central element 14, whereby according to the invention the hub cap 10 can also be fundamentally, therefore embodiment independent, formed in one piece. In order to create a fluid connection to the environment, the hub cap 10 or the main body 16 has a fluid channel 60 which, in the embodiment shown, extends at least substantially parallel to the axial direction A. The fluid channel 60 is in fluid communication with the surroundings. This fluid channel 60 is in fluid communication with the circumferential groove 42, wherein the sealing ring 100 is arranged in the groove 42. Through this, it is possible to cause a movement of the sealing ring 100, in particular in positive radial direction R, at a certain pressure within the fluid channel 60, so that the environment is in fluid communication with the inner space I and thus a venting of the inner space I can take place. The central element 14 also forms a central opening 12, which is formed rotationally symmetrically about the axial direction A. This central opening 12 serves in particular to accommodate a rotor unit 300, although in the illustrated embodiment example the rotor unit 300 is not shown for reasons of clarity.

Figure 3:
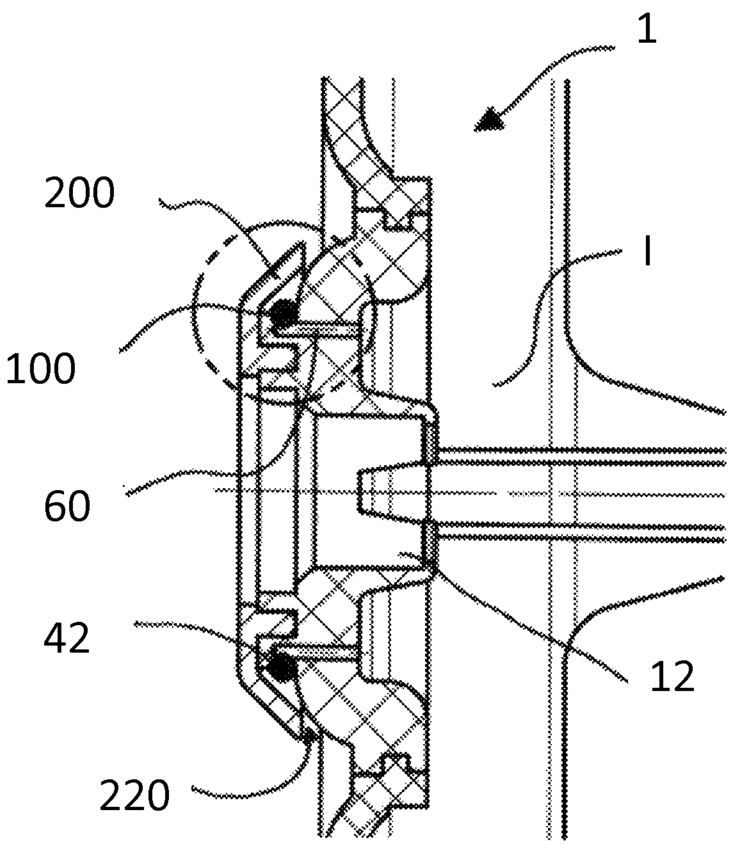
FIG. 3 shows an alternative design of a hub cap system in a sectional view.

In FIG. 3, an embodiment similar to FIG. 2 is shown. However, the sealing element 100 is covered by the cover element 200 in axial direction A and radial direction R to effectively prevent mechanical damage to the sealing ring 100. An annular flow exit channel 220 is formed between the cover element 200 and the hub cap 10, through which a fluid can escape from the inner space to the surroundings during a venting operation.

Figure 4:
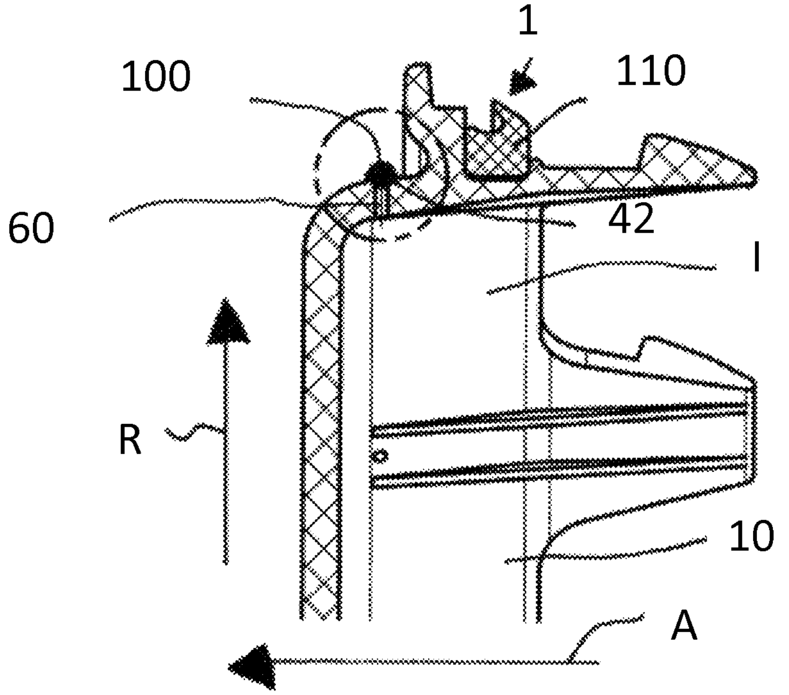
FIG. 4 shows another alternative design of a hub cap system in a sectional and detailed view.

FIG. 4 shows an alternative embodiment of a hub cap system 1, wherein the hub cap system 1 comprises a sealing ring 100 and a sealing ring 110 with a sealing lip pointing outward in radial direction R. The sealing lip is provided with a sealing ring 110. In order to enable or establish a fluid connection between the groove 42 and the inner space I of the hub cap 10, the hub cap 10 has a fluid channel 60 pointing in the radial direction R. As a result, a particularly effective and short venting possibility of the inner space I of the hub cap 10 with respect to the environment can be achieved.

Figure 5:
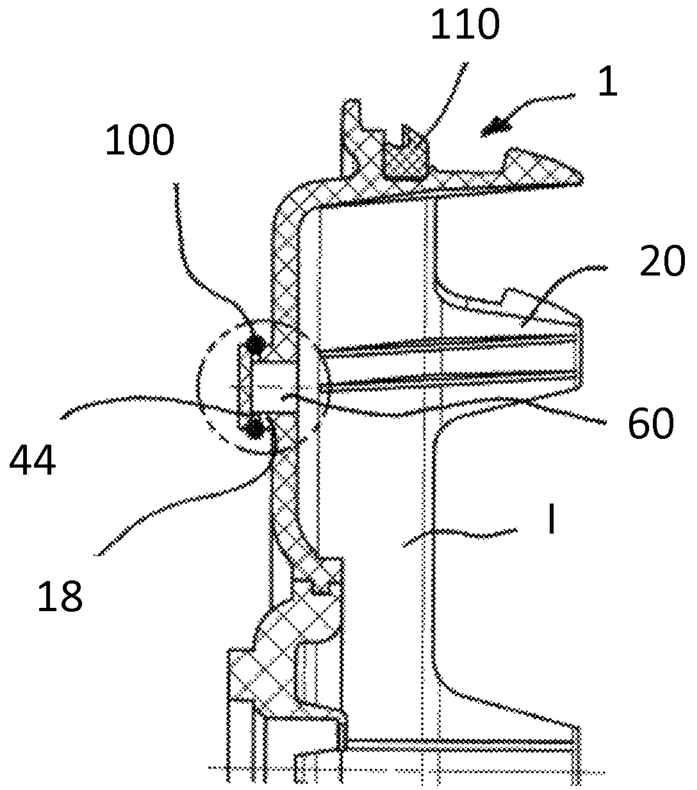
FIG. 5 shows a further preferred embodiment of a hub cap system in a sectional view.

FIG. 5 shows a likewise alternative embodiment of a hub cap system 1. The hub cap system 1 has a fluid channel 60 running in axial direction A, which is and/or can be brought into fluid connection with the groove 42 via openings 44. The sealing ring 100 is arranged within the annular groove 42. In order to achieve a particularly compact design, the groove 42 is formed on a projection 18 which points in the axial direction A. The hub cap 10 has fastening means 20 which point in the axial direction A and in the radial direction R and form and/or can form a click fastener.

Figure 6:
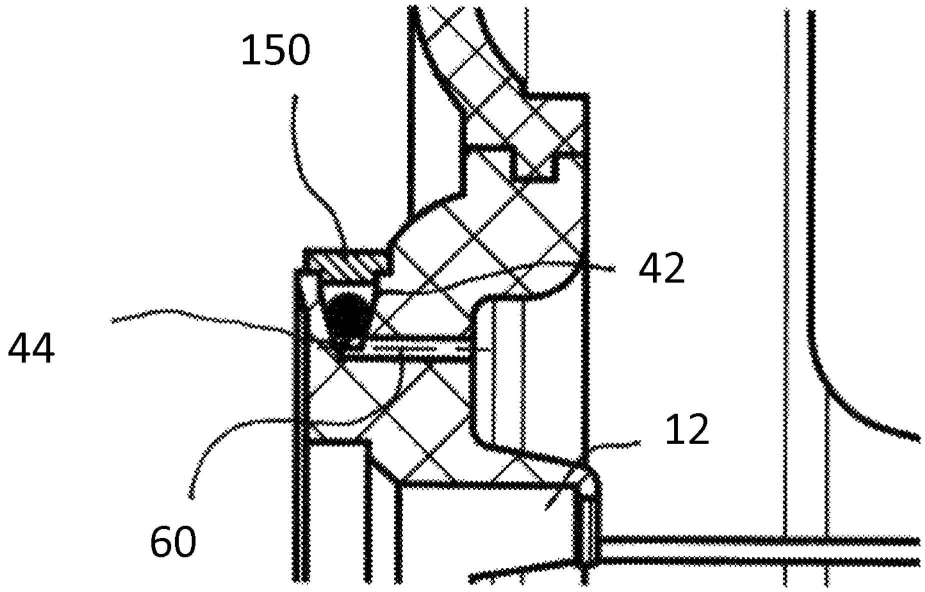
FIG. 6 shows another particularly preferred embodiment of a hub cap system in a sectional view.

FIG. 6 shows a further embodiment, also shown in a sectional view, with the sectional plane also spanned by the axial direction A and the radial direction R. The sealing ring 100 is arranged entirely within the groove 42, the side walls of the groove being V-shaped. The groove 42 is in fluid communication with the fluid channel 60 facing in the axial direction A via an opening 44. In order to achieve a radial delimitation and/or covering of the groove 42 and/or the sealing ring 100, an annular element 150 is in engagement with the groove 42. Basically, in the sense of the invention, an annular element is given in particular if this forms a ring which is closed in itself. An exception to this can be the ring element 150, which in one possible embodiment can form only a ring segment. Alternatively, preferably, however, the ring element 150 can also be annular, thus forming a self-contained ring. More conveniently, however, in such an embodiment, an aperture and/or recess is formed within the ring element 150 which, in an assembled state, can form a fluid connection between the groove 42 and the environment and/or a flow exit channel.

Figure 7:
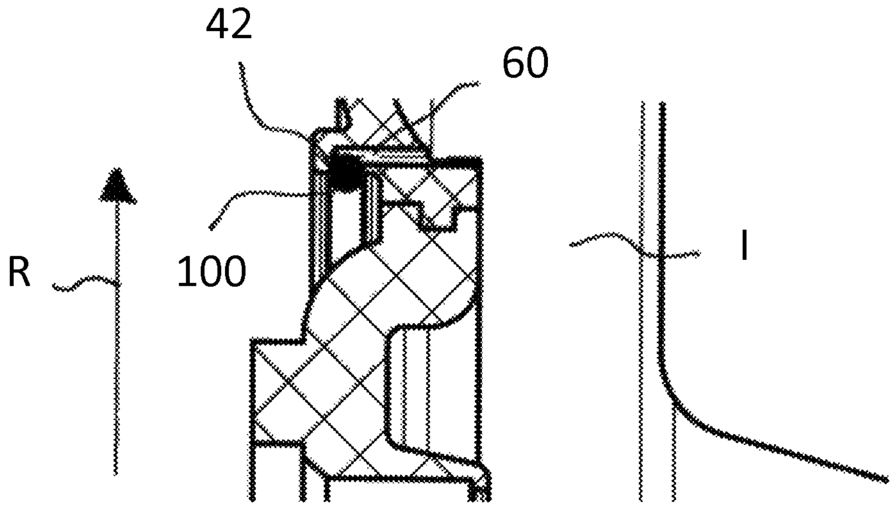
FIG. 7 is a further preferred sectional view of a hub cap system, in particular with a sealing ring preloaded in the positive radial direction.

FIG. 7 shows an embodiment of a hub cap system 1 whose inner space I can enter into fluid communication with the environment through the groove 42 and the fluid channel 60. The sealing ring 100 is preloaded in positive radial direction R, in particular by spring wire inserts of the sealing ring 100.

Figure 8:
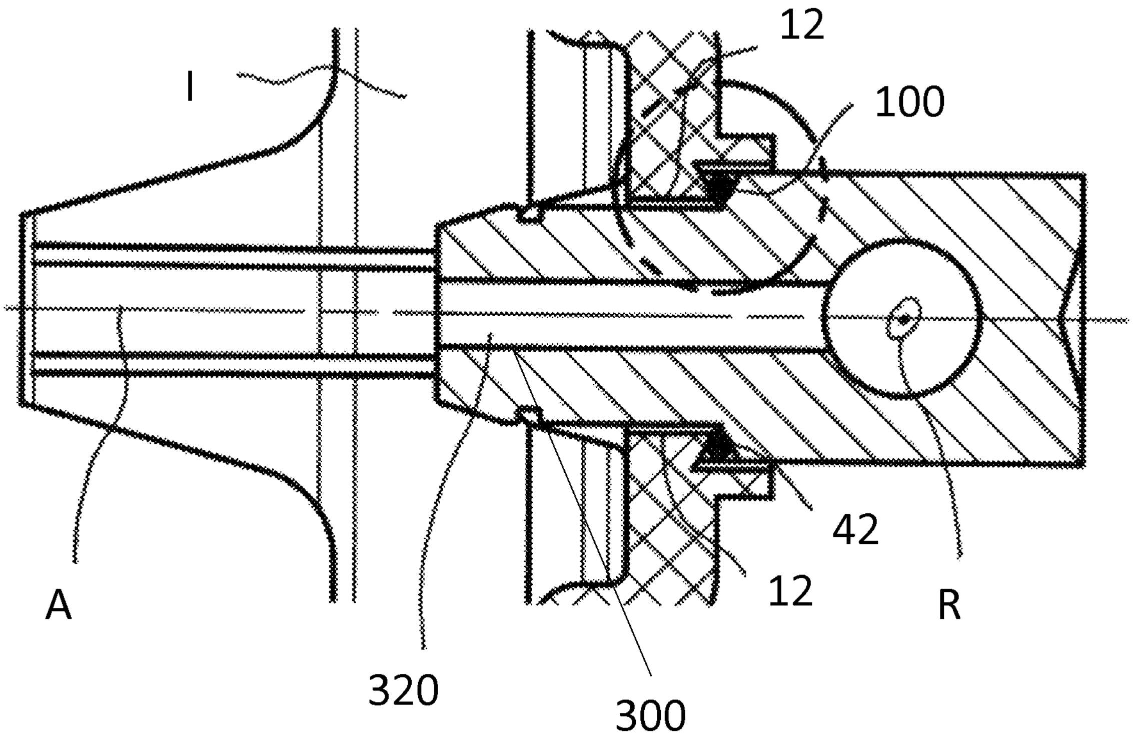
FIG. 8 is a hub cap system with a rotor unit also according to a preferred embodiment of the invention.

FIG. 8 shows a detailed view of a hub cap system 1, which has a rotor unit 300. The rotor unit 300 is guided within a central opening 12 of the hub cap 10, wherein in the example shown the hub cap 10 is formed in one piece. Alternatively, preferably, the hub cap 10 may also be formed in multiple parts and therefore comprise, for example, a central element 14 and/or a main body 16. The rotor unit 300 has a compressed air passage 320 extending in the axial direction A and passing through the central opening 12. The central opening 12 also forms a fluid channel 60, such that the inner space I of the hub cap 10 is in fluid communication with the groove 42 through the central opening 12 and/or the fluid channel 60. A part of the groove 42 or one of the side walls of the groove 42 arranged in a V-shape relative to each other is formed by the hub cap 10, and the side wall opposite in the axial direction A, on the other hand, is formed by the rotor unit 300. The sealing ring 100 is arranged inside the groove 42. The rotor unit 300 has a connection 310, which points in the radial direction R. This connection 310 can have a thread 312, on which in turn a hose and/or another fluid-conducting element can be arranged, in particular in order to establish a fluid connection between the connection 310 and a tire.

LIST OF REFERENCE SIGNS

1 Hub cap system
2 Wheel head
10 Hub cap
12 Central opening
14 Central element
16 Main body
18 Protrusion
20 Fastener
42 Groove
44 Opening
60 Fluid channel
100 Sealing ring
110 Sealing ring
150 Ring element
200 Cover element
220 Flow exit channel
300 Rotor unit
310 Connection
312 Thread in connection 310
320 Compressed air duct
500 Axle element
510 inside hollow area of axle element 500
600 Wheel hub
A Axial direction
I inner space/Interior
R Radial direction

The invention claimed is:

1. A hub cap system comprising:

a hub cap and a sealing ring;

wherein the hub cap system is configured to rotate about an axial direction;

wherein a radial direction is perpendicular to the axial direction;

wherein the hub cap at least partially encloses an inner space;

wherein the hub cap includes a fluid channel which is in fluid communication with the inner space or opens into the inner space;

wherein the sealing ring is held in a circumferential groove of the hub cap system;

wherein the groove is configured to be brought into fluid communication with the fluid channel by openings;

wherein the openings are arranged between the groove and the fluid channel; and wherein one end of the fluid channel is in direct contact with the groove through the openings such that a pressure from the fluid channel can act on the sealing ring causing the ring to move radially and allow fluid to pass laterally past the ring.

2. The hub cap system according to claim 1, wherein the sealing ring is completely arranged in the groove, and wherein the groove is entirely closed in the radial direction by the sealing ring.

3. The hub cap system according to claim 2, wherein the groove is formed on a projection of the hub cap projecting in the axial direction.

4. The hub cap system according to claim 3, wherein the projection is cylindrically shaped.

5. The hub cap system according claim 3, wherein the groove and/or the sealing ring located in the groove is covered by a cover element in axial direction and/or in radial direction, and wherein an annular flow exit channel is located between the cover element and the hub cap.

6. The hub cap system according to claim 5, further comprising:

a rotor unit that includes a compressed air duct, wherein the rotor unit is fixed to and guided by the hub cap.

7. The hub cap system according to a claim 6, wherein the groove is formed by the hub cap and the rotor unit.

8. The hub cap system according to claim 1, wherein the groove is formed on a projection of the hub cap projecting in the axial direction.

9. The hub cap system according to claim 8, wherein the projection is cylindrically shaped.

10. The hub cap system according claim 1, wherein the groove and/or the sealing ring located/arranged in the groove is covered by a cover element in axial direction and/or in radial direction, and wherein an annular flow exit channel is located between the cover element and the hub cap.

11. The hub cap system according to claim 1, further comprising:

a rotor unit that includes a compressed air duct, wherein the rotor unit is fixed to and guided by the hub cap.

12. Hub cap system according to a claim 11, wherein the groove is formed by the hub cap and the rotor unit.

13. A wheel head comprising:

the hub cap system according to claim 1; and an axle element wherein the axle element is hollow on the inside.

14. The wheel head according to claim 13, further comprising:

a rotor unit that includes a compressed air duct, wherein the rotor unit protrudes into the hollow duct of the axle element and/or wherein the compressed air duct of the rotor unit is or is configured to be in fluid communication with the internally hollow portion of the axle element.

15. A wheel head, comprising:

the hub cap system of claim 1; and a wheel hub.

16. A commercial vehicle comprising the hub cap system according to claim 1.

17. A commercial vehicle, comprising:

a wheel head, comprising:

a hub cap system, comprising:

a hub cap, a sealing ring and a rotor unit;

wherein the hub cap system is configured to rotate about an axial direction;

wherein a radial direction is perpendicular to the axial direction;

wherein the hub cap at least partially encloses an inner space;

wherein the hub cap includes a fluid channel which is in fluid communication with the inner space or opens into the inner space;

wherein the sealing ring is held in a circumferential groove of the hub cap system;

wherein the groove is or is configured to be brought into fluid communication with the fluid channel by openings;

wherein the openings are arranged between the groove and the fluid channel; and wherein one end of the fluid channel is in direct contact with the groove through the openings such that a pressure from the fluid channel can act on the sealing ring causing the ring to move radially and allow fluid to pass laterally past the ring wherein the rotor unit includes a compressed air duct, wherein the rotor unit is fixed to and guided by the hub cap; and an axle element that is hollow on the inside, wherein the rotor unit protrudes into the hollow of the axle element and/or wherein the compressed air duct of the rotor unit is or is configured to be in fluid communication with the internally hollow portion of the axle element.

18. The commercial vehicle according to claim 17, wherein the sealing ring is completely arranged in the groove, and wherein the groove is entirely closed in the radial direction by the sealing ring.

* * * * *